March 31, 1936.  C. M. C. BAIRD  2,035,736
HOSE CONSTRUCTION
Filed June 5, 1935   2 Sheets-Sheet 1
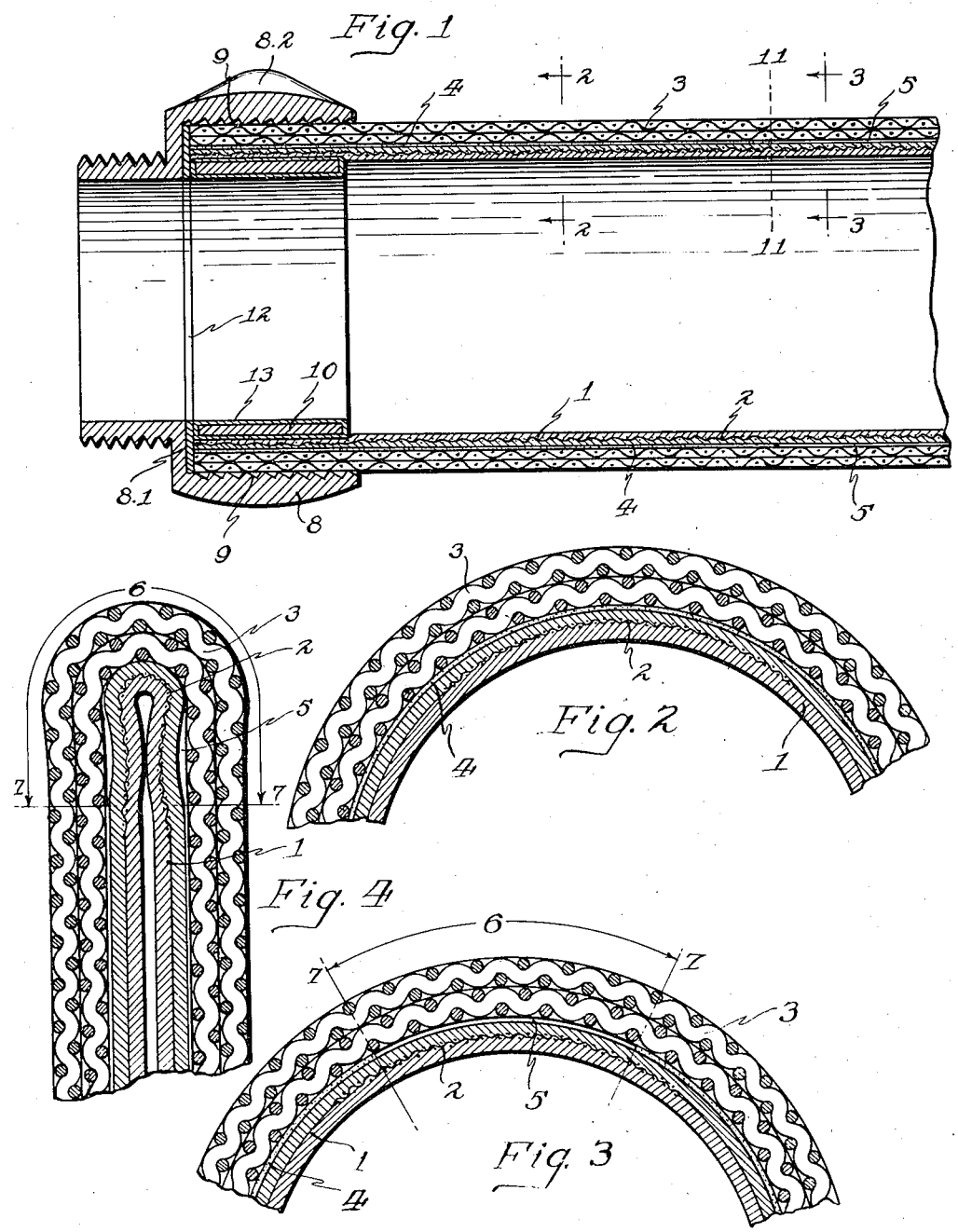
Inventor
Cassius M. Clay Baird
by Rummler, Rummler & Woodworth
his Attys.

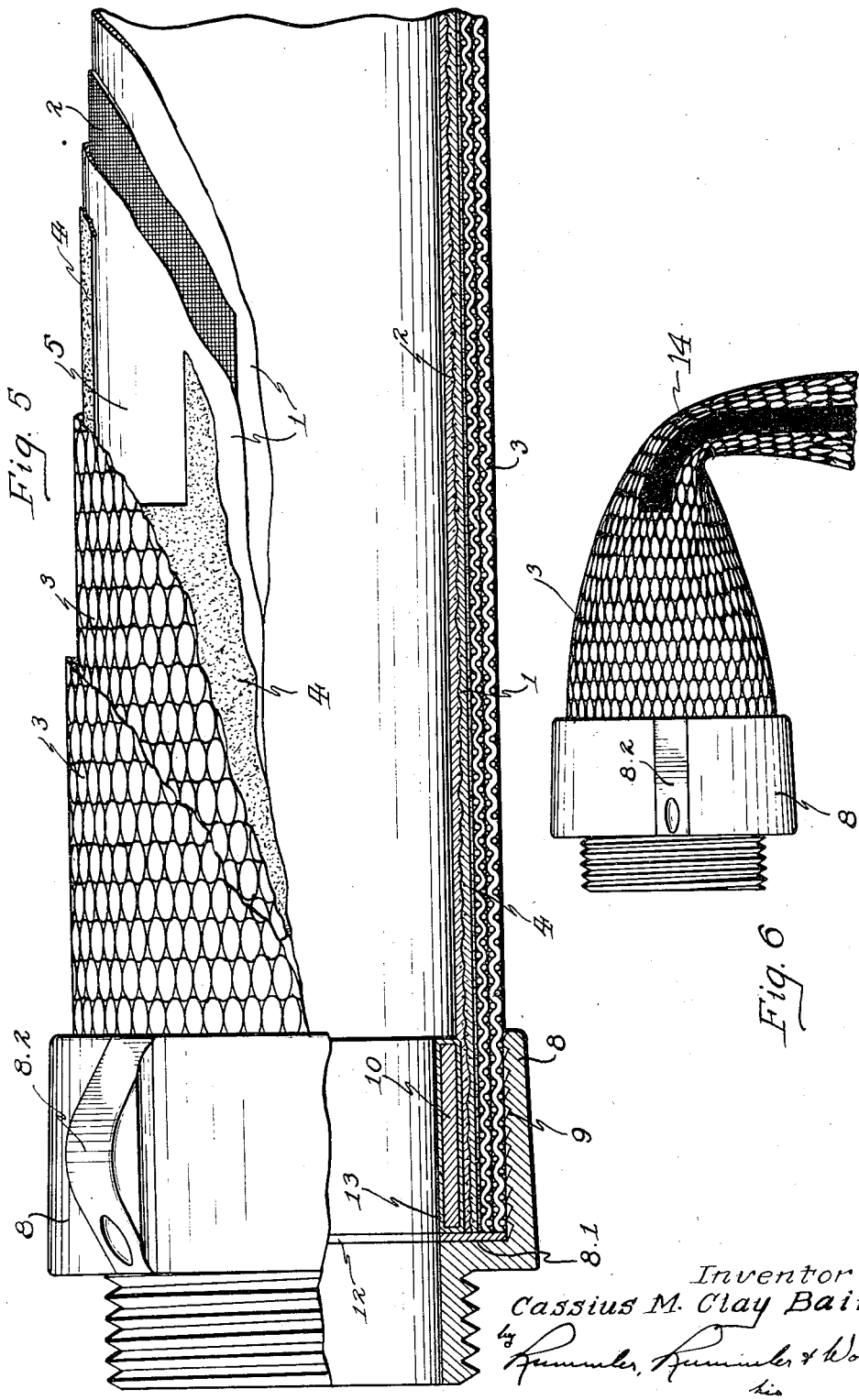
March 31, 1936.  C. M. C. BAIRD  2,035,736
HOSE CONSTRUCTION
Filed June 5, 1935  2 Sheets-Sheet 2
Inventor
Cassius M. Clay Baird Patented Mar. 31, 1936

2,035,736

UNITED STATES PATENT OFFICE 2,035,736

HOSE CONSTRUCTION

Cassius M. Clay Baird, Chicago, Ill.

Application June 5, 1935, Serial No. 25,068

2 Claims. (Cl. 138—53)

This invention relates to improvements in flat-folding hose construction and the attachment thereof to metal couplings, with particular reference to high pressure hose, having a rubber inner lining cemented to a woven fabric outer casing.

Flat folding hose such as that to which this invention relates is shown and described in my patents, No. 935,086, issued September 28, 1909, No. 1,301,354, issued April 22, 1919, and No. 1,453,823, issued May 1, 1923, which are directed to flat-folding hose constructions having an inner lining arranged to be free from the outer woven casing or jacket in the vicinity of the lines of fold on opposite sides of the hose, such free portions of the inner lining being suitably reinforced with fabric strips enclosed within the lining walls.

The main objects of this invention are to provide an improved flat-folding hose arrangement wherein the seepage of water along the lines of fold and between the inner lining and the outer casing is substantially obviated; to provide an arrangement of attaching flat-folding hose to a coupling such as to obviate the possibility of water seeping between the lining and the jacket from the coupling end of the hose; to provide an improved non-corrosive means for attaching flat-folding hose to a coupling; and to provide an improved hose end and coupling arrangement for flat lined folding hose whereby the hose is sealed at the coupling against seepage of water between the lining and jacket and along the lines of fold without detracting from its flat-folding characteristics and advantages.

A specific embodiment of this invention is shown in the accompanying drawings in which:

Figure 1 is a sectional view illustrating the hose construction and the arrangement for a joint with a coupling.

Fig. 2 is a sectional view as taken on line 2—2 of Fig. 1 showing the construction of the hose body adjacent the coupling.

Fig. 3 is a similar view taken on line 3—3 of Fig. 1 showing the construction of the main portion of the hose body between the couplings.

Fig. 4 is an enlarged fragmentary sectional view showing the relationship of the inner lining and the casing at the line of fold when the hose is in a flat folded condition.

Fig. 5 is an enlarged view of a hose end and coupling broken away to show the construction of the same.

Fig. 6 is a view showing how the hose bends adjacent the coupling when the hose is empty and folded flat.

In the form shown in the drawings the hose comprises a tubular inner lining 1 preferably made in two layers of rubber or other suitable flexible impervious material cemented together or otherwise united, and having embedded between the layers strips of bias cut canvas or other suitable reinforcing material 2 extending lengthwise of the hose and disposed at the position of the longitudinal lines of fold, there being two such strips of reinforcement 2 extending the entire length of the hose and disposed on opposite sides thereof. Surrounding the inner lining 1 is a heavy fabric tubular casing 3 which is tightly woven around and cemented to the lining 1 in the usual manner.

However, as shown the cement 4 is omitted from that part of the hose adjacent each line of fold, leaving the lining 1 free from the casing at that area as shown in Figs. 3 and 4, and indicated in said figures by a space designated by the numeral 5. This free area or space 5 extends substantially equi-distant laterally on each side of the line of fold and throughout the length of the hose, occupying a segment of the hose section such as that indicated by the arc 6, Fig. 3, extending between the lines 7. The reinforcement 2 embedded in the lining 1 is preferably made of such width that it will extend beyond the free area 5 on each side thereof as shown in Figs. 3 and 4.

The result obtained from this construction is illustrated by Fig. 4 of the drawings, and is fully described in my aforementioned patents, and permits the hose being folded flatly, as is the usual practice with relatively large high pressure hoses such as fire hoses, without buckling or creasing the rubber inner lining 1, which being free from the casing 3 will readily assume an unstressed position, as shown.

Such hose construction has been in common use for many years and is well known in the art. However, one difficulty has been encountered in its use that has not heretofore been satisfactorily overcome. This difficulty is the seepage of water into the space 5 which does not readily dry out and tends to cause a rotting of the fabric outer casing. The outer casing 3 is ordinarily woven so tightly that while it may become wet there is not much likelihood of water passing into the space 5 from the outside of the hose. However, it has been found that, because of several factors, water will seep or leak into the space 5 from the inside of the hose by way of the end thereof that is clamped or secured in the coupling, either because of improper fastening of the hose end in the coupling, or because of corrosion of the clamping ring which results in small cracks and spaces through which water under pressure may seep to reach the end of the hose and thus make its way into the space 5.

I have discovered that corrosion of the hose clamping ring is mainly caused by sulphuric acid which is formed within the hose by the reaction of the water remaining in the hose after use and the sulphur which is contained in the rubber inner lining, and with knowledge of this fact I have devised the herein-described improved hose and coupling arrangement whereby the aforementioned seepage of water into the space 5 may be obviated.

This may be accomplished by an arrangement such as shown in Fig. 1 wherein a hose end is shown secured in a coupling 8. The coupling 8 which may be either a male or female fitting, is of the usual construction having a straight walled opening in which the end of the hose is inserted and secured, the inner wall of said opening terminating at its inner end at an annular shoulder 8.1 and being provided with serrations 9 which are formed so as to bite into the outer fabric casing of the hose after the same has been forced against the serrations by means of a clamping ring 10, inserted in the coupling and expanded according to the usual practice to clamp the hose end in place.

As shown in Fig. 1 the hose is constructed during its manufacture so that at its end portions only the lining 1 is cemented to the casing 3 around its entire periphery, thus terminating the free area or space 5 along the lines of fold at a point substantially five or six inches from the coupling 8, this point being indicated by the line 11—11 in Fig. 1. Thus that part of the hose that is next adjacent the coupling 8 becomes a unitary structure in which the lining and the casing are bonded securely together around the entire periphery of the lining, leaving no space or free area through which water may seep. The bonding together of the lining and the casing around the entire hose at this portion thereof has no effect on the flat folding characteristics of the remaining portion of the hose since due to the rigid coupling at the hose end complete flattening cannot begin until about 8 inches from the coupling at which point the free area or space 5 is provided along the lines where the hose creases when flattened.

As further protection against leakage of water through the joint between the hose and the coupling a suitable gasket 12 is first inserted in the coupling against the shoulder 8.1 before the hose end is put in place to be clamped, and after the hose end is fitted into the coupling it is brought to bear tightly against the gasket 12. Then a clamping ring 10 made of brass, or some other suitable material, provided with an exterior coating 13 of lead, or other suitable ductile and non-corrosive material, is provided to clamp the hose end against the serrations 9. Lead is a good example of such a ductile coating material for the expansion, or clamping ring 10, since it will not crack or chip when the clamping ring is being expanded to grip the hose and is proof against corrosion from the sulphuric or other acids that might be produced in the hose by the reaction of water and the chemicals which may be contained in the hose inner lining.

Another advantage in providing a ductile coating on the clamping ring 10 is that it eliminates burrs or other roughness found on the edges of the usual rings. Such burrs or roughness tend to cut or tear the rubber lining of the hose so as to weaken the same and permit leakage of water. Also when the ring is inserted into the hose such burrs are apt to engage the inner edge of the hose end and cause the inner end margins to pucker and separate from the casing sufficient to allow water to seep into the space between the casing and the lining.

It is also found that by cementing the hose lining to the jacket around its entire periphery at the hose end, the possibility of the lining puckering in advance of the clamping ring is obviated, so that water hammer and vibrations found in many ordinary constructions are prevented. In the practice of my invention the reinforcement 2, which is built into the lining 1 along the lines on which the hose is to fold, is continued beyond the free space 5 to the ends of the hose so as to give added strength and resistance to puckering of the lining when the clamping ring 10 is inserted.

As shown in Fig. 6, the outer surface of the hose casing is marked in commercial practice with a band of color, contrasting with the white color of the cotton fabric, as indicated at 14, to show the location and extent of the uncemented or free areas between the lining and the casing. Such markings extending along each of the longitudinal fold lines of the hose also permit the same to be quickly located to properly position the lugs 8.2 of the male coupling 8 when the same is being secured on the end of the hose at the time of initial assembly or repair.

Thus a hose and coupling arrangement is provided wherein all the desirable features of flat folding hose are retained and wherein a hose end coupling joint or connection is formed such as to completely obviate any possibility of water working or forcing its way into the free area along the lines of fold through the end thereof that is fastened in the coupling member.

Although but one specific embodiment of this invention is herein shown and described, it will be understood that details of the construction shown may be altered or omitted without departing from the spirit of this invention as defined by the following claims:

I claim:

1. A hose construction comprising a tubular casing adapted to be flattened when empty and a tubular lining of flexible impervious material cemented to the inner surface of the casing, said lining being free from the casing at opposite sides thereof where it creases when flattened and throughout substantially the major portion of the length of the hose and being cemented to said casing around its entire periphery for the remaining portion of said hose adjacent an end thereof.

2. A hose having a coupling-engaging end portion which in use is held by a coupling from flattening, comprising a tubular casing adapted to be flattened beyond said end portion, and a tubular lining of flexible impervious material in uniform adherence around its entire circumference directly to the entire inner surface of the said end portion of the casing, said lining being free of the casing along its sides opposite the creases throughout the flattened length of the casing, and being in secure adherence with the casing along its flattened length between said creases.

CASSIUS M. CLAY BAIRD.